(12) United States Patent
Markov

(10) Patent No.: US 6,344,818 B1
(45) Date of Patent: Feb. 5, 2002

(54) APPARATUS AND METHOD FOR THE DETECTION OF MATERIALS

(76) Inventor: Yuri Markov, Levaki - V Block 9A, Entrance D., Apt. 100, Sofia 1000 (BG)

( * ) Notice: Subject to any disclaimer, the term of this patent is extended or adjusted under 35 U.S.C. 154(b) by 0 days.

(21) Appl. No.: 09/317,073

(22) Filed: May 17, 1999

(30) Foreign Application Priority Data

May 22, 1998 (EP) .............................................. 98109383

(51) Int. Cl.[7] .............................................. G01S 13/00
(52) U.S. Cl. .............................. 342/22; 342/27; 342/90; 342/193
(58) Field of Search ........................... 342/193, 90, 27, 342/22, 195, 192, 194

(56) References Cited

U.S. PATENT DOCUMENTS

| 1,492,300 A | | 4/1924 | Lowy .......................... 324/330 |
|---|---|---|---|
| 3,691,558 A | | 9/1972 | Hoard et al. ................... 343/7.7 |
| 3,828,245 A | | 8/1974 | Uterberger ...................... 324/6 |
| RE28,544 E | * | 9/1975 | Stein et al. ................... 378/146 |
| 4,053,891 A | | 10/1977 | Opitz ......................... 343/5 SA |
| 4,385,516 A | | 5/1983 | Uffelman ......................... 73/24 |
| 4,920,313 A | * | 4/1990 | Constant ...................... 324/300 |
| 5,039,981 A | * | 8/1991 | Rodriguez ................... 340/551 |
| 5,081,456 A | * | 1/1992 | Michiguchi et al. .......... 342/22 |
| 5,227,800 A | * | 7/1993 | Huguenin et al. ........... 342/179 |
| 5,249,162 A | | 9/1993 | Kirkland ..................... 367/131 |
| 5,455,590 A | * | 10/1995 | Collins et al. ............... 342/179 |
| 5,557,283 A | * | 9/1996 | Sheen et al. ................. 342/179 |
| 5,867,257 A | * | 2/1999 | Rice et al. .................. 356/28.5 |
| 5,942,899 A | * | 8/1999 | Shrekenhamer et al. .... 324/326 |
| 6,091,240 A | * | 7/2000 | Smith et al. ................. 324/300 |

FOREIGN PATENT DOCUMENTS

| DE | 254517 | 4/1911 | ..................... 21/20 |
|---|---|---|---|
| DE | 2535259 | 2/1977 | ............ G01V/3/12 |
| FR | 1105325 | 11/1955 | ....................... 12/4 |
| JP | 59-12177 | 6/1984 | ............ G01V/3/12 |
| WO | WO97/07416 | 2/1997 | ............ G01V/3/12 |

OTHER PUBLICATIONS

Sandy, John et al: "Overview of Gas–Sensing Radar Surveys Theory, Instrumentation, Surveying, and Interpretation, " Oil Gas Journal, Feb. 1, 1988, vol. 86, No. 5, pp. 69–71, XP002107180.

Optiz, C.L.: "Metal–detecting radar rejects clutter naturally," Microwaves, vol. 15, No. 8, Aug. 1, 1976, pp. 12–14, XP002107181.

* cited by examiner

Primary Examiner—John B. Sotomayor
(74) Attorney, Agent, or Firm—Gardner, Carton & Douglas

(57) ABSTRACT

A device to detect the presence of a target material comprising a source module and detector module. The source module includes a generator to producing a source signal corresponding to a characteristic frequency of the target material. The detection nodule detects a location of the target material wherein the detection module detects an interference signal generated between the source signal and a signal generated by target material caused by exposure to the source signal. The device uses frequencies between 10 MHz and 1.3 GHz

34 Claims, 3 Drawing Sheets

APPARATUS AND METHOD FOR THE DETECTION OF MATERIALS

BACKGROUND OF THE INVENTION

1. Field of the Invention

The present invention relates to the detection of materials, and in particular to an apparatus and method that detects the presence of a given material in any location using a characteristic frequency of the material.

2. Scope of the Prior Art

The ability to detect the presence of a material in any location is a requirement in many disciplines and industries. Determining if a particular material in large or small quantities is present at any location is a concern in medicine, research, exploration forensics, security, law enforcement, and for safety reasons. For example, at points of entry for national borders, and at some complexes, and buildings it can be necessary that contents of baggage and boxes and other such cargo containers be identifiable by inspection or detection methods when searching for contraband such as narcotics, stolen goods, unauthorized medicines and plants explosives and accelerants, liquids, chemicals, and other materials. There are similar requirements for unobtrusively searching people, as well as for searching of modes of transportation such as motor vehicles, aircraft and vessels for contraband cargo including the presence of hidden human cargo. Detection technology is applicable in medicine for detection of toxins, broken bones, tumors, and foreign objects introduced to the body. Forensic science and other fields of research also use detection technology for both verification and exploratory reasons.

To detect objects, materials and things that are not detectable by the human eye for any given reason, many different types of devices and methods have been developed. One of the most common is X-ray technology. X-ray devices are used to inspect luggage, baggage and other containers. While X-ray technology works well in some cases by identifying the shape of objects within a container, it lacks in the ability to detect some materials or to penetrate some container materials.

X-ray technology is also used in the field of medicine to observe the internal structure of the human or animal body. Similarly, Magnetic Resonance Imagining (MRI) technology and Nuclear Magnetic Resonance (NMR) technology is employed in medicine and other fields with advantages to each. CAT scans, which uses NMR technology, and MRIs are considered by some to be safer when used on humans than X-ray technology. But as with X-ray technology, these machines employing these other technologies are expensive, and cannot detect all materials in all locations. NMR has been used to detect contraband material. In order to be effective in detecting materials, NMR requires relatively large magnets which are expensive. Another limitation of NMR is that it can expose humans to strong magnetic fields. One draw back to NMR is that its magnets can damage magnetically stored information commonly found in computers.

Nuclear Quadrupole Resonance (NQR) is another method of detecting material. NQR is similar to NMR but doesn't require the use of large magnets. It uses a range of radio frequency spectroscopy that exploits the inherent electrical properties of atomic nuclei. Accordingly, an atomic nucleus emits a quadrupole resonance when the nucleus encounters a specific given electrical field that is produced by a surrounding environment. Typically, when exposed to a given frequency, a material responds and emits an NQR signal.

Each given material has a set of given NQR frequencies that are dependent on the chemical structure of the material. For example, nitrogen ($^{14}N$) is a chemical structure found in some narcotics and explosives. When the appropriate radio frequency for nitrogen ($^{14}N$) is exposed to an explosive or narcotic containing nitrogen ($^{14}N$), the material will emit an NQR signal.

Different types of devices have been developed to use the NQR of nitrogen ($^{14}N$) to detect the presence of explosives particularly in airline luggage and other a transportation containers. In order to be effective, most devices that operate on NQR use equipment that can both transmit and receive radio frequencies. Those devices also require relatively high energy sources to effectively create an NQR signal that can be detected from the material. Even with high energy sources, the NQR signal emitted from the material has a low energy that is relatively hard to detect. For example, an NQR detection device that has a 2 kW source can detect the presence of a given material from only centimeters away. Thus, the transmitter and receiver must be relatively close to the substance to actually detect its presence. Because of the relatively low energy emitted by the substance, NQR detection devices can effectively only detect the presence of explosives or other materials in a given location. Accordingly, suitcases and the like must be placed in a relatively small space in order for NQR to be used to detect the presence of contraband.

In addition to NMR and NQR materials have other types of spectral fingerprints. These spectral fingerprints depend on the chemical components that make up the material. When a given material is exposed to an energy signal of a given frequency that corresponds to one of spectral fingerprints, a so-called characteristic frequency, the material will emit a corresponding energy signal having essentially the same frequency. As is the case with fluorescence, the frequency of the mirror energy emitted from a material may vary slightly from the original frequency. Most known research into these characteristic frequencies have been conducted with energy sources having a frequency of less then 10 MHz, which is the range of frequencies that a material will experience NQR.

NQR effects the atomic nuclei with respect to the electrons shielding the particular nuclei being measured. But when atoms are exposed to other energy levels, the energy causes reactions, to the electrons. The electron energy in a molecule is 1–100 electron volts (eV). This energy is also represented in parts per eV; for example, the "vibration energy" of an electron is measured in tenths of an electron volt, and the "rotation energy" of an electron is measured in thousandths of an electron volt. In NQR, the nuclei can change levels when the nuclei comes in contact with an external energy source. It is believed, however, that exposure to low energy sources has an effect on the energy of the electrons. It is also believed that low level energy effects the electron orbitals.

SUMMARY OF THE INVENTION

In view of the foregoing, the present invention relates to an apparatus and method of detecting the presence of materials. It is an object of the present invention to overcome the deficiencies of the prior art. Thus, it is an object of the present invention to be able to detect a given material in an undisclosed place as well as the ability to detect a material in a given location. It is also an object of the present invention to detect the presence of a material using energy produced by an atom when it is exposed to characteristic frequencies of that given material. In addition, the apparatus should be able detect materials over a wide range with a relatively low level power source.

In order to detect the presence of a given material at any great distance, the present invention detects the interference generated between the a source energy and the characteristic energy emitted from the material. The interference signal generated between the source energy and the energy emitted from a material is a series of pulses that occur when the two signals cross. The two signals will undoubtedly be out of phase with each other. Since the two signal will be at the same general frequency, however, the interference signal will also be at that frequency. Since the characteristic energy emitted from the target material is a derivative of the characterstic energy, the interference occurs at given intervals. Even though the energy level of the signal emitted by the target material is relatively low, and can be hard to detect on its own, the interference signal is constant and does not depend upon the energy level if the signal emitted by the target source. The interference signal is constant over a wide range and can be detected because of the known parameters of the source signal and the signal emitted by the source.

Accordingly, the present invention includes a source module and a detection module. The source module generates an energy signal having a given frequency and that corresponds to the a characteristic frequency of the material to be detected. The detection module detects the presence of the interference signal that is created between the source energy signal and the energy emitted from the target material at the same frequency as the source signal. The interference signal is dependent upon the characteristic frequency of the target material.

The source module includes a frequency generator that is connected to an antenna that has a given size, or length, that depends upon the wavelength of the energy signal. The source module may also include an inductor so that a multi-phase signal will be emitted.

The detection module includes a rotatable antenna. To improve performance, the antenna can be connected to a signal generator that is preferably set to the characteristic frequency. It is believed that the generator connected to the detection module serves as an amplifier of the interference signal and a filter for surrounding frequencies. The detection module antenna is also connected to a coil that can be tightly wound and oriented in a vertical direction relative to ground and perpendicular to the antenna. The detection module can include a modulator that is set to a relatively small frequency as compared to the source signal. The modulator enhances the detection of the interference signal by the antenna by varying the interference field. The size and orientation of the antennas, the modulator and the detection module source generator are all configured to enhance the ability of the detection module to detect the presence of a material in any given location. It has been observed that the detection device of the present invention operates optimally when the source generator emits an energy signal of between 100 MHz and 1.5 GHz.

In operation, the source generator is activated to emit an energy signal of a target material's characteristic frequency between 100 MHz and 1.5 GHz. Depending on the power level of the energy source, the source module will begin to activate the electrons of any material that has the characteristic frequency generated within a given area after a few seconds. Once the target material is activated, it too will begin to emit a signal having the characteristic frequency. As will be understood by one skilled in the art, an interference signal at the characteristic frequency will occur between the source signal and the target material signal even though the energy level of the target material signal may be relatively weak.

The detection module is moved through a range between the source module and the target material. When the detection module encounters the highest energy line between the source module and target material, which is the shortest line between the two energy sources, the antenna will rotate to designate that the line has been crossed. Depending on the orientation that the detection module coil is wound, the antenna will rotate in the direction of the target material or the source. As the antenna continues to move through a range it will continue to point in the direction of the source module and the target material. Once a set of co-ordinates for the target material have been generated then the exact location of the target can be calculated. If the exact location of the material is known, as in a suitcase, the principles of the present invention can be use to detect if a target material is in that location. The mere detection of the interference signal will indicate that location contains the target material.

These and numerous other features and advantages of the present invention will become readily apparent from the following description, the accompanying drawings and the appended claims.

DETAILED DESCRIPTION OF THE PREFERRED EMBODIMENTS

Figure 1:
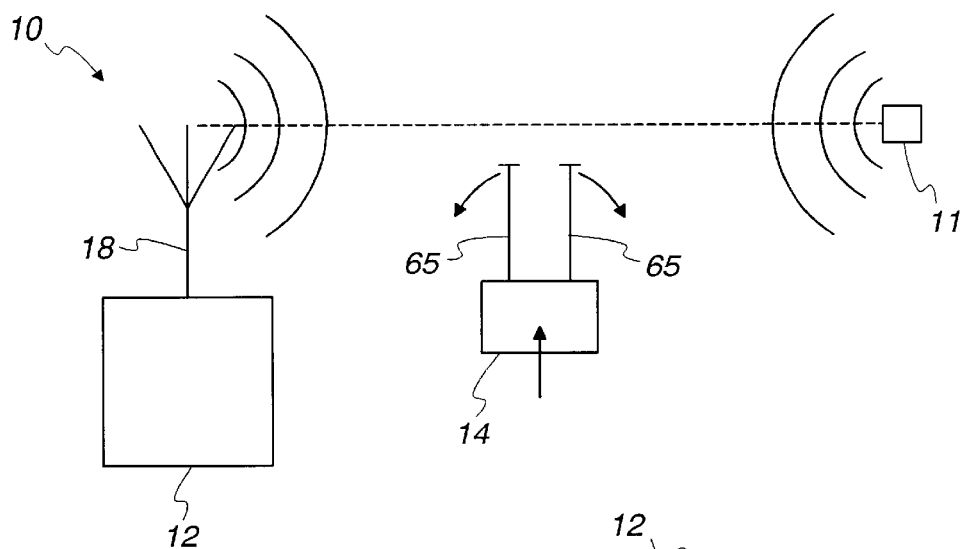
FIG. 1 is a drawing of an apparatus used to detect the presence of a material in an unknown location made in accordance with the principles of the present invention.

In FIG. 1, a schematic drawing of a device 10 that detects the presence of a target material 11 in an unspecified location made in accordance with the principles of the present invention is shown. As described more fully below, the present invention generally includes a source module 12 and a detection module 14. The source module 12 generates an energy signal having frequency corresponding to the characteristic frequency of the given material for which the device is searching. Such materials may be polyethylene, analgesics, explosive, narcotics, and other materials. The detector module includes an antenna which can detect the interference caused by the signal emitted by the source generator and the signal emitted by the target 11.

Figure 2:
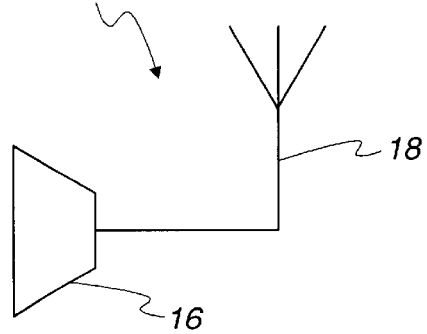
FIG. 2 is a drawing of the generator used by an embodiment of the present invention.

FIG. 2 is a schematic drawing of the source module 12 of one embodiment of the present invention. The source module 12 includes a frequency generator 16. Preferably, the generator 16 is precise and can produce a frequency signal nearly identical to the set signal. It has been observed that if the generator 16 emits an energy signal with a deviation of +/−1 kHz and in some cases +/−2 kHz from the desired characteristic frequency, a device made in accordance with the principles of the present invention may produce irregular results for the present invention. In the preferred embodiment, the source frequency generator 16 should be able to produce signals between 100 MHz to 1.5 GHz. Of course, the principles of the present invention can work within frequency ranges less than 100 MHz and greater than 1.5 GHz. In addition on, it is believed that the principles of the present invention can operate with frequencies in the microwave range.

The generator 16 is connected to an antenna 18, which can be a standard rod antenna. The length of the rod antenna 18 is dependent upon the wave length of the signal. Thus, it is preferable that the antenna 18 be adjustable to accurately emit the set frequency signal.

Figure 3:
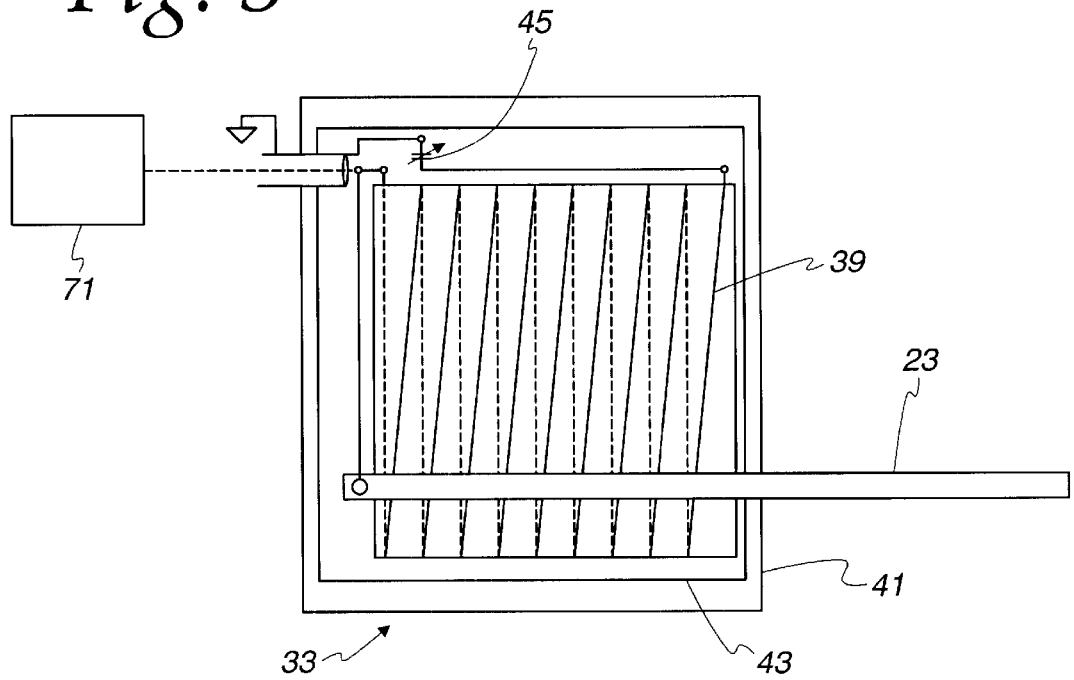
FIG. 3 is an electrical diagram of the detector shown in FIG. 3.
Figure 4:
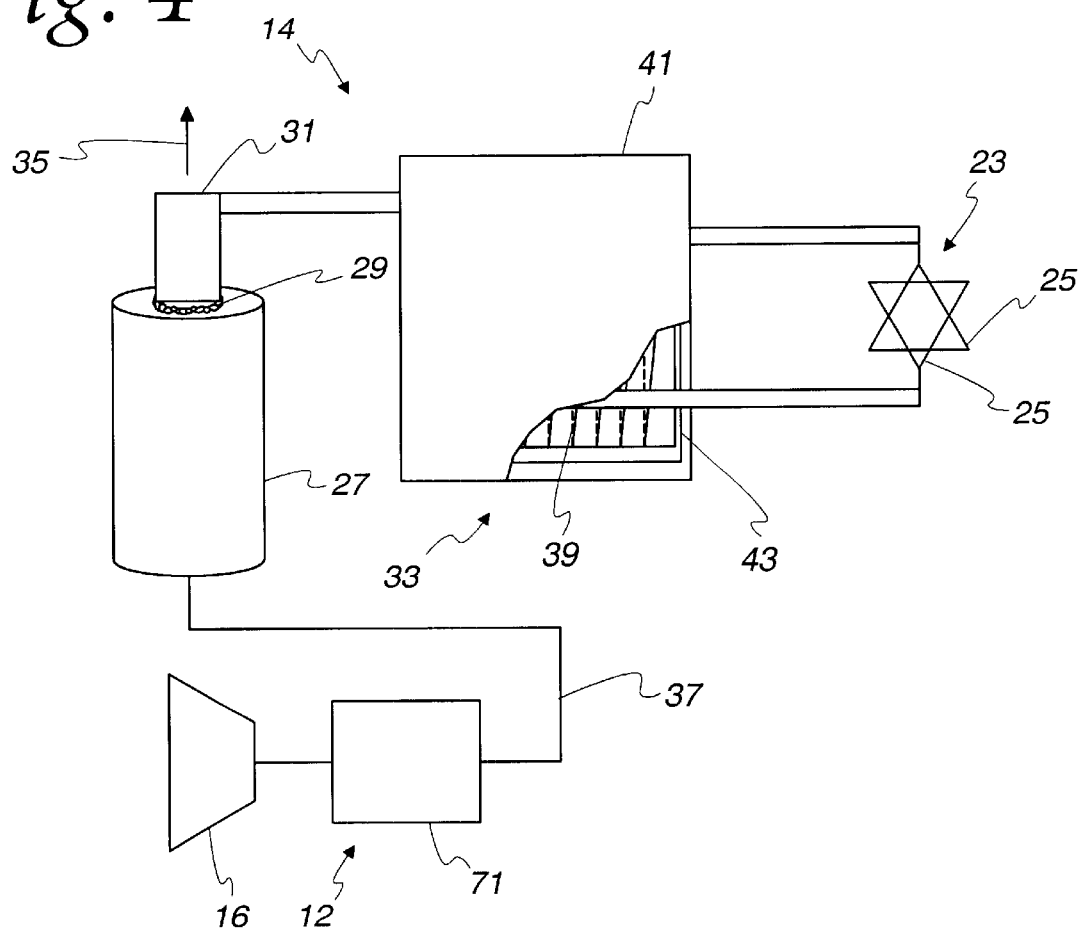
FIG. 4 is a drawing of the detector used by the embodiment showed in FIG. 2.

FIG. 3 is an illustration of the detection module 14 used by the first embodiment of the present invention. The detection module 14 as shown in FIGS. 3–4 includes an antenna 23 to detect the interference signal that occurs between the source signal generated by the source module 12 and the signal generated by the target 11. For optimal performance of the detection module 14, the dimensions of the antenna 23 are dependent on the wave length of the characteristic signal of the material. An antenna 23 having a length that is ¼ the wavelength of the characteristic frequency can be used to detect a given material. Another example of the antenna 23 used in this embodiment of the present invention is a star antenna having six sides. The star antenna is created with two triangles 25 where each triangle side has a length that is one-eighth of the wave length. This construction provides an antenna 23 with the maximum affect of detecting the interference signal with the minimum volume. Each triangular portion 25 of the star antenna 23 has a connection end.

The antenna 23 is connected to a rotator portion 27. The rotator portion 27 includes a bearing assembly 29 and rotating arm 31. The rotating arm 31 is connected to the antenna 23 through the coil section 33, which is described below. As can be readily understood by one skilled in the art, the bearing assembly 29 permits the rotating arm 31 to rotate about the vertical axis 35 of the rotator portion 27. The other end of the rotator portion 27 is connected to the signal generator by cable 37.

In addition, the detection module 14 includes a coil section 33. For the star antenna, there are two connection points into the coil section 33. The coils 39 are vertically wound and are of any given length. It has been observed that the optimal length for the coils 39 depends on the wave length of the characteristic signal. In the preferred embodiment, the coil 39 is made of a wire having a 0.05 millimeter thickness with a resistance of approximately 20 k$\Omega$. The capacitance of the wire can be variable. In the preferred embodiment, the wire is tightly wound between 4.000 and 5,000 times to produce the coil 39.

The detection module 14 preferably includes two coils 39 described above. One coil 39 is wrapped to the left and the other coil (not shown) is wrapped to the right. The two coils 39 are contained within a plastic casing 41 and are separated by a metal plate 43. One end of each coil 39 is connected to the source generator 16 by the cable 37. The other end of each coil 39 is connected to ground through a capacitor 45. The coils 39 are positioned so that they are perpendicular to the antenna 23 and the around. In the preferred embodiment the coils 39 can be adjusted so that they are within 5 to 10 degrees from perpendicular with the ground to still detect the presence of a target material 11.

The detection module 14 is connected to the source module 12 using the cable 37, which is preferably a shielded coaxial cable. The cable 37 has any given length but is preferably a length that is dependent on the wave length of the source signal. It has been observed, that a cable 37 that is one half the wave length is optimal for the detection of a given material. It should be understood, however, that it is not necessary for the detection module 14 to be connected to the source generator 16, or any other signal generator, for proper operation. A passive detection module not shown, which is not connected to a signal generator, will still detect the presence of materials and operate in accordance with the principles of the present invention. The connection to a signal generator, such as a source generator 16, set to the target material's 11 characteristic frequency appears to serve as an amplifier of the detected interference signal as well as a filter from other surrounding signals in the area that the device operates. A modulator 69, described below, can also be used.

Figure 5:
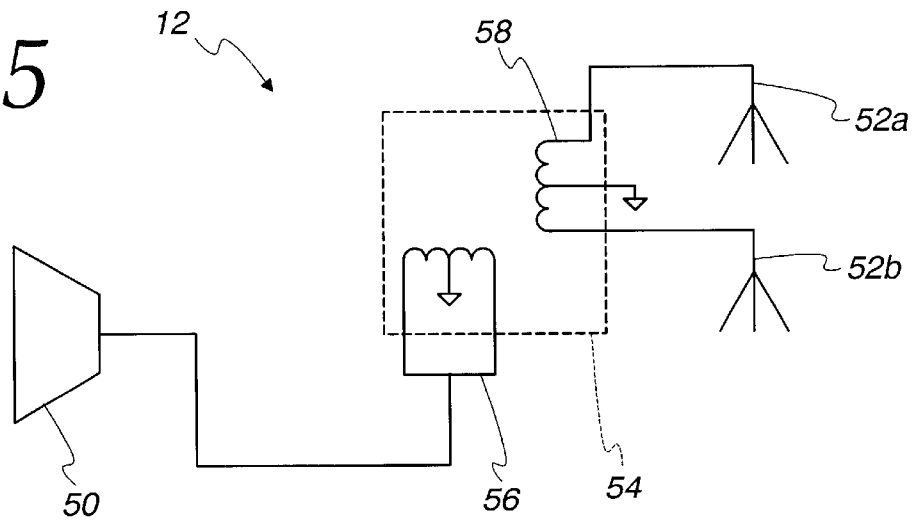
FIG. 5 is a drawing of a generator of a further embodiment of the present invention.
Figure 6:
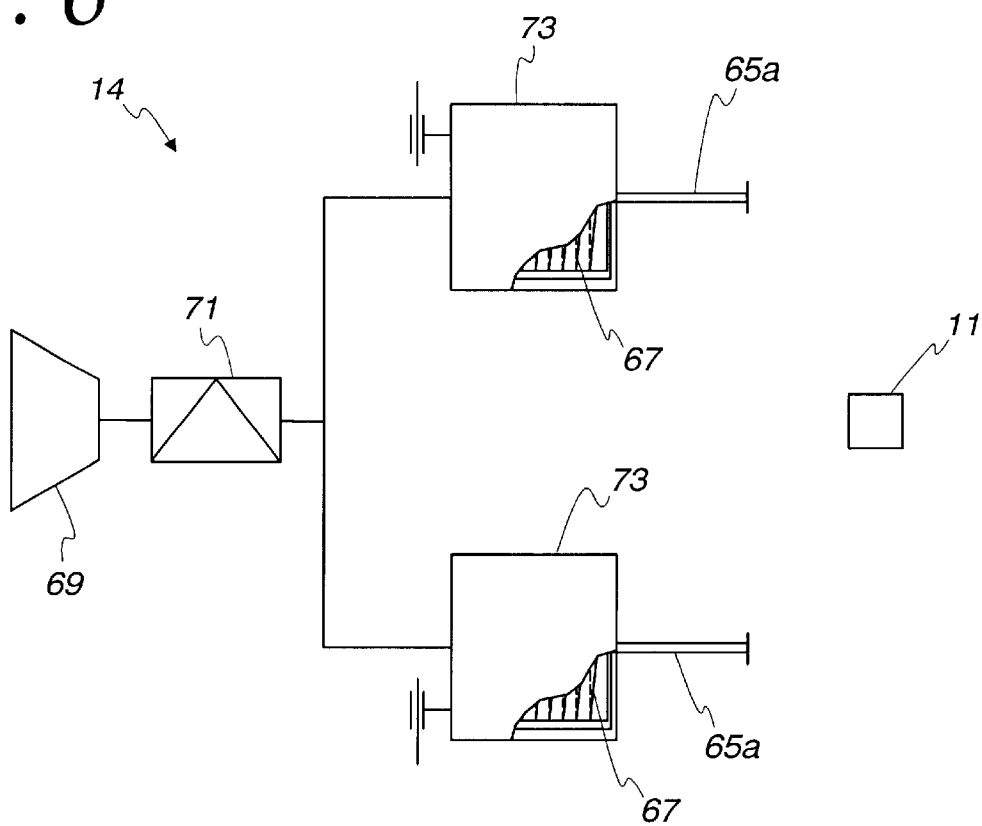
FIG. 6 is a drawing of a modulator used by the generator shown in FIG. 5.
Figure 7:
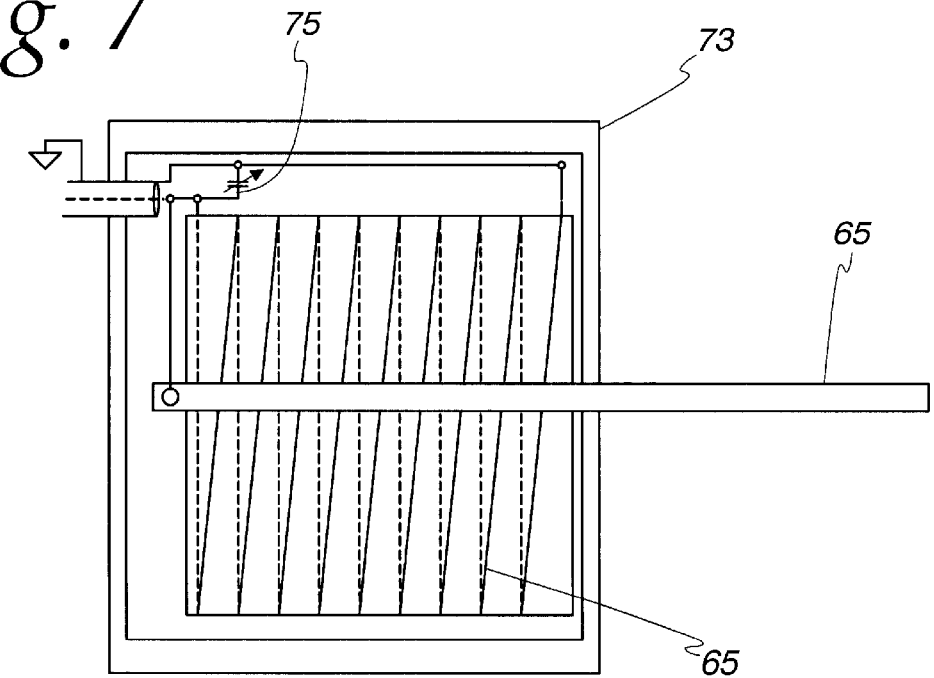
FIG. 7 is an electrical diagram of the detector shown in FIG. 6.

FIGS. 5–7 illustrate a second embodiment of the present invention. This embodiment also includes a source module 12, shown in FIG. 5, and a detection module 14, shown in FIGS. 6–7. The source module 12 includes a signal generator 50, which also should produce a precise signal to the selected frequency. The generator 50 is connected to at least one antenna 52. In the preferred embodiment, the generator is connected to two antennas 52a and 52b that are parallel. It has further been observed that the distance between the two antennas 52a, 52b should be very small and particularly small as compared to the wave length of the generated signal. As the distance between the antennas 52a, 52b increases, the precision at which a detection module 14 detects the presence of a material may be affected. It is also desirable that the antennas 52a, 52b be parallel and have an end that can penetrate the ground.

Between the generator 16 and the antennas 52a, 52b, the source module 12 includes an inductor 54 as shown in FIG. 6 to create a multi-phase signal. The purpose of the inductor 54 is to increase the presence of the interference signal for detection by the detection module 14. The inductor 54 is constructed with two coils 56, 58 that are perpendicular to one another. The first coil 56 is connected to the source 50, and the coil's midpoint is connected to ground. The second coil 58 is perpendicular to the first coil 56. The midpoint is connected to common ground and both ends of are connected to an antenna 52a, 52b respectively. The purpose of the inductor 54 is to increase the ability of the source module 12 and the detection module 14 to detect the presence of the interference.

The detection module 14 of the second embodiment of the present invention is shown in FIG. 6. This embodiinent includes two antennas 65a, 65b that are individually connected to a coil 67 and a detection module 14 signal source generator 69. In the preferred embodiment, the detection module 14 also includes a modulator 71. The antennas 65a, 65b are typical adjustable rod antennas. As has been discussed previously, the antennas 65a, 65b can be of any given length. It has been observed, however, that the optimal length of the antennas 65a, 65b is dependent on the wave length of the characteristic frequency. The antenna 65 is connected to the coil 67. The coil 67, in turn, is connected to the source generator 69.

The coil 67 is perpendicular to the antenna 65 and is constructed similar to the coil 39 as described in the first embodiment. It has been observed that other types of coils (not shown) may be used but the vertically oriented coil is preferably. One antenna 65a is connected to a coil 67 that is wrapped to the right, and the other antenna 65b is connected to a coil 67 that is wrapped to the left. The coils are enclosed in a Casing 73. The right-hand coil 67 is placed on the right-hand side of the detection module 14 and the left-hand coil 67 is connected on the left-hand side of the detection module 14. For each coil 67, one end is connected to the antenna 65 and the other end is connected to ground. A capacitor 75 is placed in parallel between the second end and the source. The antenna 65 and the coil 67 are connected to a rotational point that is connected to the source as described for the first embodiment.

The modes of operation for the above described embodiments of the present invention will now be described. As has been mentioned, the purpose of the present invention is to locate the presence of target materials 11 in any location. The operation of the preferred embodiments does not depend on the target material 11 being in any particular location. Thus, the present invention can be used to determine if a given substance, such as polyethylene, explosives or narcotics, is in a specific location. An example is using an embodiment of the present invention in an airport to scan luggage and other cargo that is transported in airplanes. The present invention can be also used to locate specific materials in an undisclosed location. According to the principles of the present invention, the ability to detect materials in unspecified locations can extend over vast distances and up to ten thousand meters. The ability to detect materials at great distances only requires that the power level of the source module 12 be increased a reasonable amount, for example, up to 10 watts.

For the first embodiment of the present invention, the generator 16 at the source module 12 is set to the specific characteristic frequency of a given material. For example. a frequency for an analgesic such as acetaminophen is 146.4677 MHz. Polyethylene has a frequency of 438.54045 MHz. In its simplest form, the source module 12 and the detection module 14 are hand-held The source is held in one hand so that the antenna 18 is in one direction. The detection module 14 is held in the other hand so that its antenna 23 is generally perpendicular to the source module's 12 antenna 18. The source module 12 and the detection module 14 are also connected by a cable 37 so that the detection module 14 is connected to the signal source. The power level of the source module 12 is set to the appropriate power level to detect target materials 11 within a given distance. For example, a source generator 16 having a 1 watt power level can detect target materials 11 up to 1,000 meters away and a 10 watt power source can detect materials up to 10,000 meters.

After the source generator 16 is activated, the target material 11, if within the range of the source generator 16, will begin to emit its characteristic frequency that mirrors the source signal. Of course, the signal emitted by the target material 11 will depend upon frequency to which the source generator 16 has been set. It has been observed that the target materials 11 takes between 3–5 seconds to start emitting any energy at its characteristic frequency. As will be appreciated by one skilled in the art, the energy level of the characteristic frequency emitted by a target material 11 is relatively low. Furthermore, there has been observed a standard deviation of the frequency emitted by the material. Even though the energy level of the frequency emitted by the target material 11 is low and difficult to detect, an interference signal caused by the signal sent by the source material and the signal emitted by the target materials 11 is present and can be detected over great distances.

Once the target material 11 begins to emit the characteristic frequency and an interference signal is present the detection module 14 is able to detect the presence of the interference signal. The hand-held source module 12 and detection module 14 are moved from one spot to a second spot to determine if the detection module 14 can detect the presence of the interference signal. The antenna 18 of the source module 12 is parallel to the ground and pointed toward the direction that the target material 11 may be located. The antenna 23 of the detection module 14 is perpendicular to the ground and the source module's antenna 18. Assuming that the target material 11 is within the range of the device, the detection module 14 will detect the line between the target material 11 and the source generator 16 that has the highest energy level. That line is shown in FIG. 1. The interference line is the shortest distance between the source and the target 11. When the antenna 23 of the detection module 14 passes through that interference line, the antenna 16 rotates to align itself with the line of interference. Depending on the polarization of the coils 9 within the detection module 14, the antenna will rotate towards either the source generator 16 or the target material 11. If the detection module 14 is the appropriate size for the signal's wave length, the detection module 14 antenna 23 will move sharply and distinctly when it passes over the interference line. As the detection module 14 continues to move pass the interference line, the antenna 23 will continue to rotate and point in the direction toward tie source generator 16 or the target material 11 to which it originally pointed. It has been observed that the antenna 23 will also continue to rotate toward the source generator 16 or the target material 11 to which it originally pointed once it passes over the interference line in the opposing direction. In order to determine the exact location of the target material 11, the detection process described can be repeated from a different start location to obtain a set of the co-ordinates from with the location of the target material 11 can be determined using standard triangulation calculations.

It is believed that the detection module's 14 antenna 23 rotates because of the interaction in the detection module 14 coils 39 of the electromagnetic field of the interference signal and the earth's electrical magnetic field vector. As understood by one skilled in the art, the earth's magnetic field is constant and in the perpendicular direction to the ground. This is the same general direction in which the coils 39 are oriented. The electromagnetic field of the interference signal is perpendicular to the earth's magnetic field vector and when the coil encounters the electromagnetic field of the interference signal, the antenna 23 rotates in a given direction depending on the right hand rule of electromagnetic induction.

The mode of operation for the second embodiment is consistent with that of the first embodiment. The source module 12 is placed in a set location by placing the antennas 52a, 52b into the ground. Of course, other methods of affixing the source module 12 to a given location can be used. The source generator 16 in the source module 12 and the signal generator in the detection module 14 are both set to the specific frequency of the target material 11. The modulator 71 in the detection module 14 is set at another specific frequency for the purpose of specific frequency modulation required for each target material 11. For acetaminophen the modulator 71 is set to 74.7 Hz, and for polyethylene the modulator is set to 184.1 Hz.

As described above, the target material 11 will begin to emit its characteristic frequency after approximately 3 to 5 seconds of activation by the source module 12. Once the target materials 11 emits its characteristic frequency, the line of interference is created. The detection module 14, which can be hand-held, is moved and eventually will pass through the interference line. Once the detection module 14 encounters a line of interference, the antennas 65 will rotate in opposing directions. The antenna 65 closest to the source module 12 will point towards that module, and the antenna 65 closest to the target material 11 will point towards the target. As described above, the antennas 65 will continue to point in the direction of the source module 12 and target material 11, respectively. If needed, the source module 12 can be relocated and the operation repeated so that further coordinates of the target material 11 can be obtained. The exact location of the target materials 11 can then be determined using triangulation calculations.

In view of the foregoing, the principles of the present invention can be used to detect the presence of materials in a given location. The source module 12 will continue to emit the characteristic frequency from the source within a confined area. The detection module 14 will pass between the position of the source module 12 and the object being inspected. If the test object contains any of the substances being tested for, the detection module 14 will rotate thereby indicating the presence of that material. As a specific example, an automobile which contains a plastic explosive can be observed in an area. The source module 12 can be placed at any location around the automobile and the detection module 14 passed between the source and the automobile. If the automobile contains the plastic explosive, the detection module antenna will rotate to indicate that the target material 11 is present. The automobile can then later be inspected for the plastic explosive.

As can be appreciated by one skilled in the art, the detection module 14 can still detect the presence of materials in any given location without being connected to a source. In this embodiment, it has been observed that the detector will not have the sharp designation of detection as described above although the detection module antenna will respond to the interference signal. By connecting the detection module 14 lo a source signal set to the characteristic frequency, the detection module 14 contains an amplifier of the interference signal and a filter from surrounding signals.

It is also understood that each given material has multiple characteristic frequencies for which the interference can be detected It has been observed, however that the frequencies between 100 MHz and 1.5 GHz are consistent with the apparatuses described.

Of course, various changes and modifications of the preferred and alternative embodiments described will be apparent to one skilled in the art. Such changes can be made without departing from the spirit and scope of the invention and without diminishing its attendant advantages. It is, therefore, intended that such changes and modifications be covered by the appended claims.

What is claimed is:

1. A device to detect the presence of a target material, the device comprising:
    a source module, the source module including a source signal generator to generate a source signal corresponding to a characteristic frequency of the target material, the source signal adapted to strike the target material and cause the target material to emit an emitted signal, the emitted signal characteristic of the chemical composition of the target material; and
    a detection module to detect a location of the target material wherein the detection module detects an interference signal, the interference signal being the result of interference generated between the source signal and the emitted signal.

2. The device according to claim 1 wherein the source module includes a frequency generator.

3. The device according to claim 1 wherein the source signal includes at least one antenna.

4. The device according to claim 1 wherein the detection module includes at least one antenna.

5. The device according to claim 1 wherein the detection module includes a source generator.

6. The device according to claim 1 wherein the detection module includes at least one coil.

7. The device according to claim 1 wherein the detection module is hand held and detects the location of the target material by passing through the line of interference.

8. A device to detect the presence of a target material, the device comprising:
    a source module to emit a source signal between 100 MHz and 1.5 GHz that is characteristic of the target material, the source signal adapted to strike the target material and cause the target material to emit an emitted signal, the emitted signal characteristic of the chemical composition of the target material; and
    a detection module to detect a signal between 100 MHz and 1.5 GHz that is emitted by the source module and the target material wherein the detection module detects an interference signal, the interference signal being the result of interference generated between the source signal and the emitted signal.

9. The device according to claim 8 wherein the detection module detects the interference created between the source signal and a signal emitted from the target material.

10. The device according to claim 8 wherein the detection module includes an antenna set to detect an interference signal created between the source signal and a signal emitted from the target material.

11. The device according to claim 10 wherein the antenna includes at least one coil to generate a magnetic field caused by the interference signal.

12. The device according to claim 8 wherein the source module includes inductor.

13. The device according to claim 8 wherein the signal generated by the detection module includes a low frequency modulator.

14. A method of detecting the presence of a target material comprising the steps of:
    generating a source signal set to a characteristic frequency of the target material, such that the characteristic frequency is characteristic of the chemical composition of the target material;
    striking the target material with the source signal such that an emitted signal is emitted from the target material, the emitted signal characteristic of the chemical composition of the target material;
    detecting an interference signal, the interference signal being the result of interference generated between the source signal and the emitted signal.

15. The method according to claim 14 wherein the source signal is generated by a frequency generator.

16. The method according to claim 14 wherein the interference signal is detected by an antenna.

17. The method according to claim 14 wherein the detection step further comprises the step of moving the antenna to detect the interference generated on a line between the source signal and target material.

18. The method according to claim 17 wherein the detection step further comprises the first step of scanning around the source signal to detect the interference signal.

19. The method according to claim 18 wherein the detection step further comprises the second step of scanning around the source signal to detect the interference signal and calculating the location of the material using the interference signal detected by the first scanning step and the second scanning step.

20. The method according to claim 14 wherein the source signal is between 100 MHz and 1.5 GHz.

21. A device to detect the presence of a target material, the device comprising:
   a source module, the source module including a source signal generator to generate a source signal corresponding to a characteristic electronic excitation frequency of the target material, the source signal adapted to strike the target material and cause the target material to emit an emitted signal, the emitted signal the product of the electronic excitation of the target material; and
   a detection module to detect a location of the target material wherein the detection module detects an interference signal, the interference signal being the result of interference generated between the source signal and the emitted signal.

22. The device of claim 21 wherein the source module includes a frequency generator.

23. The device of claim 21 wherein the source signal includes at least one antenna.

24. The device of claim 21 wherein the detection module includes at least one antenna.

25. The device of claim 21 wherein the detection module includes a source generator.

26. The device of claim 21 wherein the detection module includes at least one coil.

27. The device of claim 21 wherein the detection module is hand held and detects the location of the target material by passing through the line of interference.

28. A method of detecting the presence of a target material comprising the steps of:
   generating a source signal set to a characteristic electronic excitation frequency of the target material, such that the characteristic frequency is characteristic of the chemical composition of the target material;
   striking the target material with the source signal such that an emitted signal is emitted from the target material, the emitted signal being the product of the electronic excitation of the target material; and
   detecting an interference signal, the interference signal being the result of interference generated between the source signal and the emitted signal.

29. The method of claim 28 wherein the source signal is generated by a frequency generator.

30. The method of claim 28 wherein the interference signal is detected by an antenna.

31. The method of claim 28 wherein the detection step further comprises the step of moving the antenna to detect the interference generated between the source signal and target material.

32. The method of claim 28 wherein the detection step further comprises the first step of scanning around the source signal to detect the interference signal.

33. The method of claim 32 wherein the detection step further comprises the second step of scanning around the source signal to detect the interference signal and calculating the location of the material using the interference signal detected by the first scanning step and the second scanning step.

34. The method of claim 28 wherein the source signal is between 100 MHz and 1.5 GHz.

* * * * *